Figure 1:
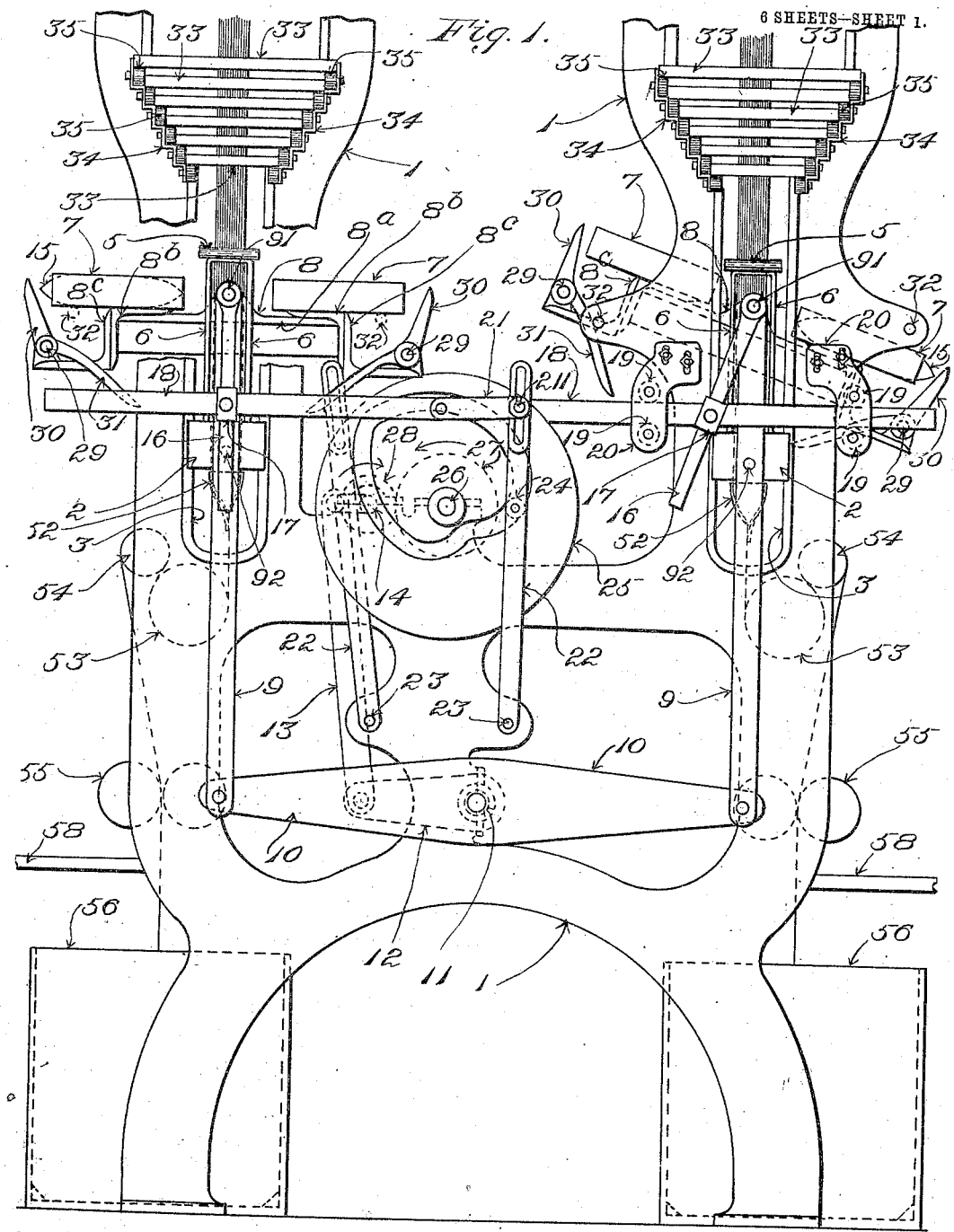

No. 850,595. PATENTED APR. 16, 1907.
G. C. MOORE.
LOOM.
APPLICATION FILED SEPT. 15, 1906.

6 SHEETS—SHEET 1.

Witnesses:
Oscar F. Hill
Edith J. Anderson

Inventor:
George C. Moore
by Chas. F. Randall
Attorney.

No. 850,595. PATENTED APR. 16, 1907.
G. C. MOORE.
LOOM.
APPLICATION FILED SEPT. 15, 1906.
6 SHEETS—SHEET 4.
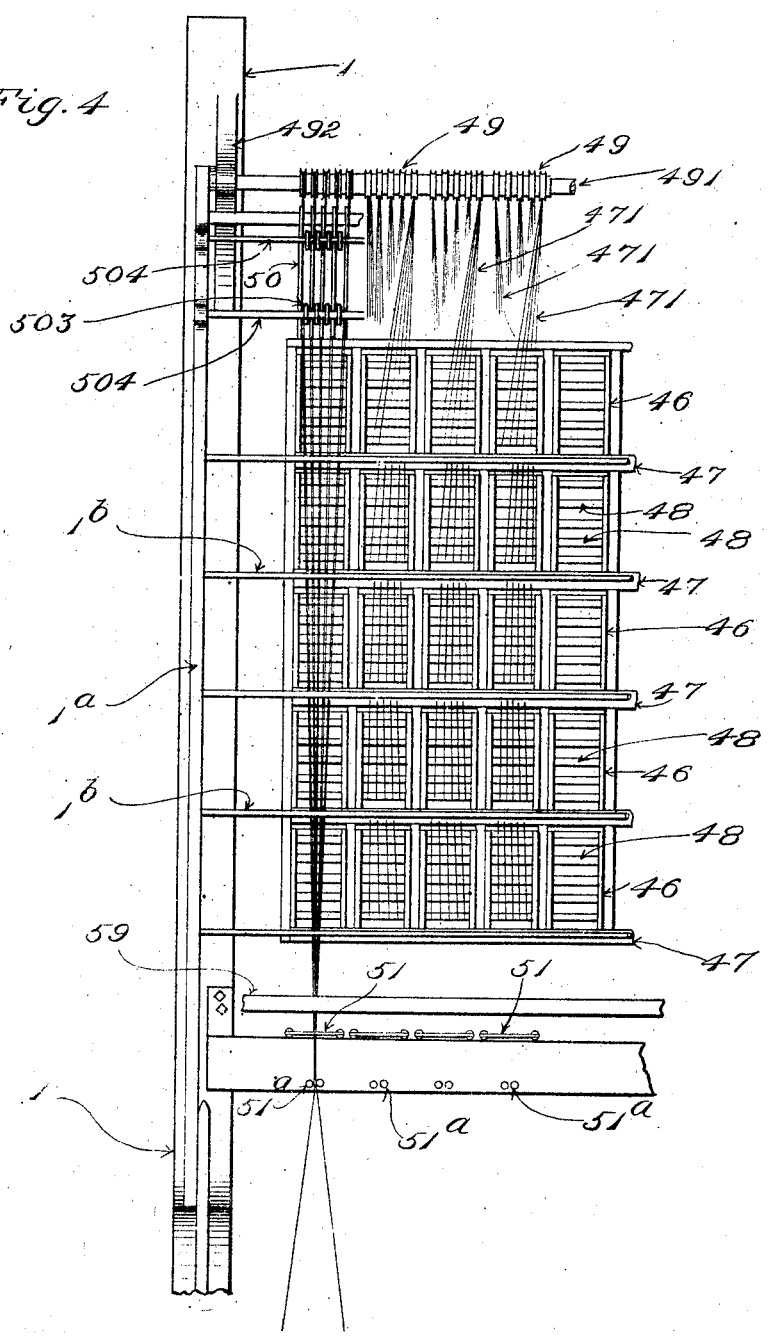
Witnesses.
Oscar F. Hill
Edith J. Andrews.
Inventor.
George C. Moore
by Chas. F. Randall
Attorney.

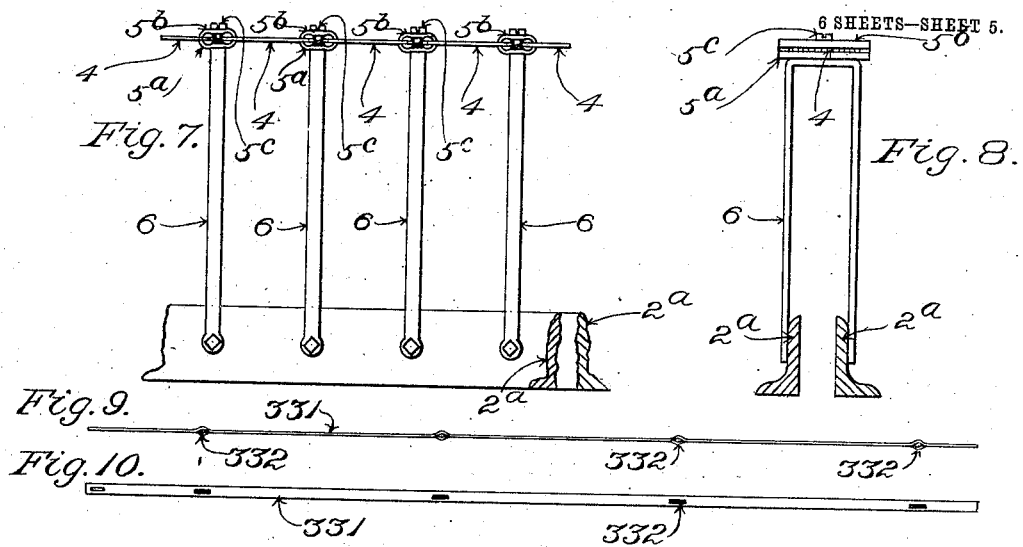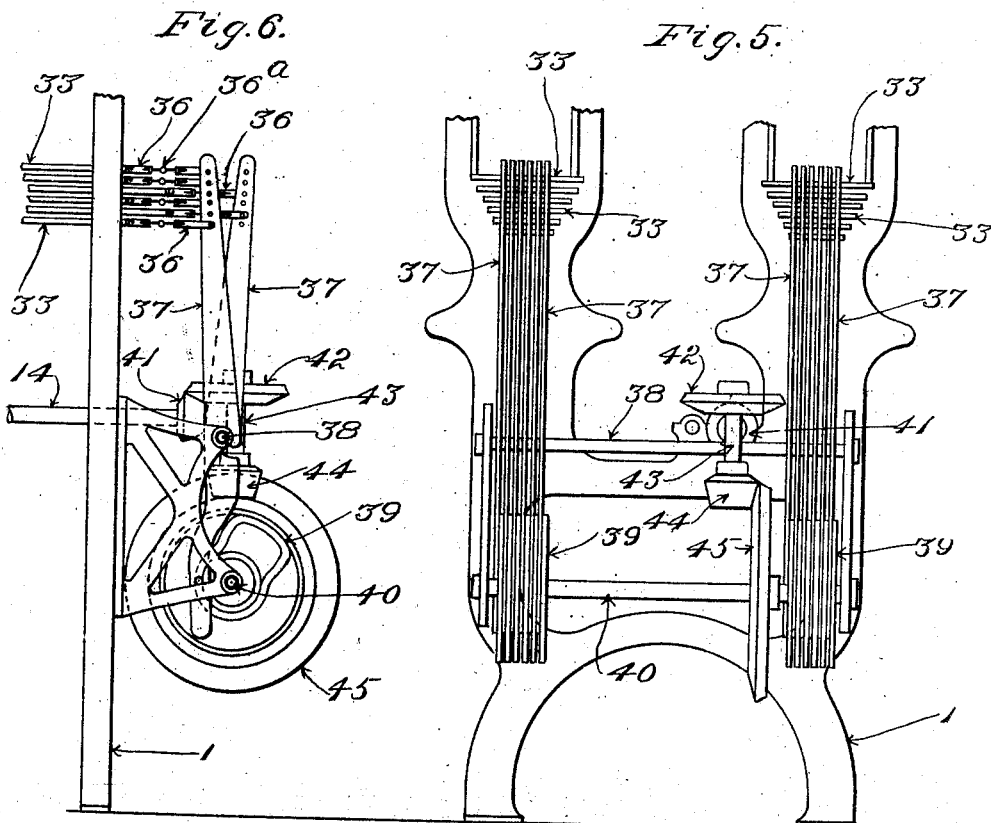

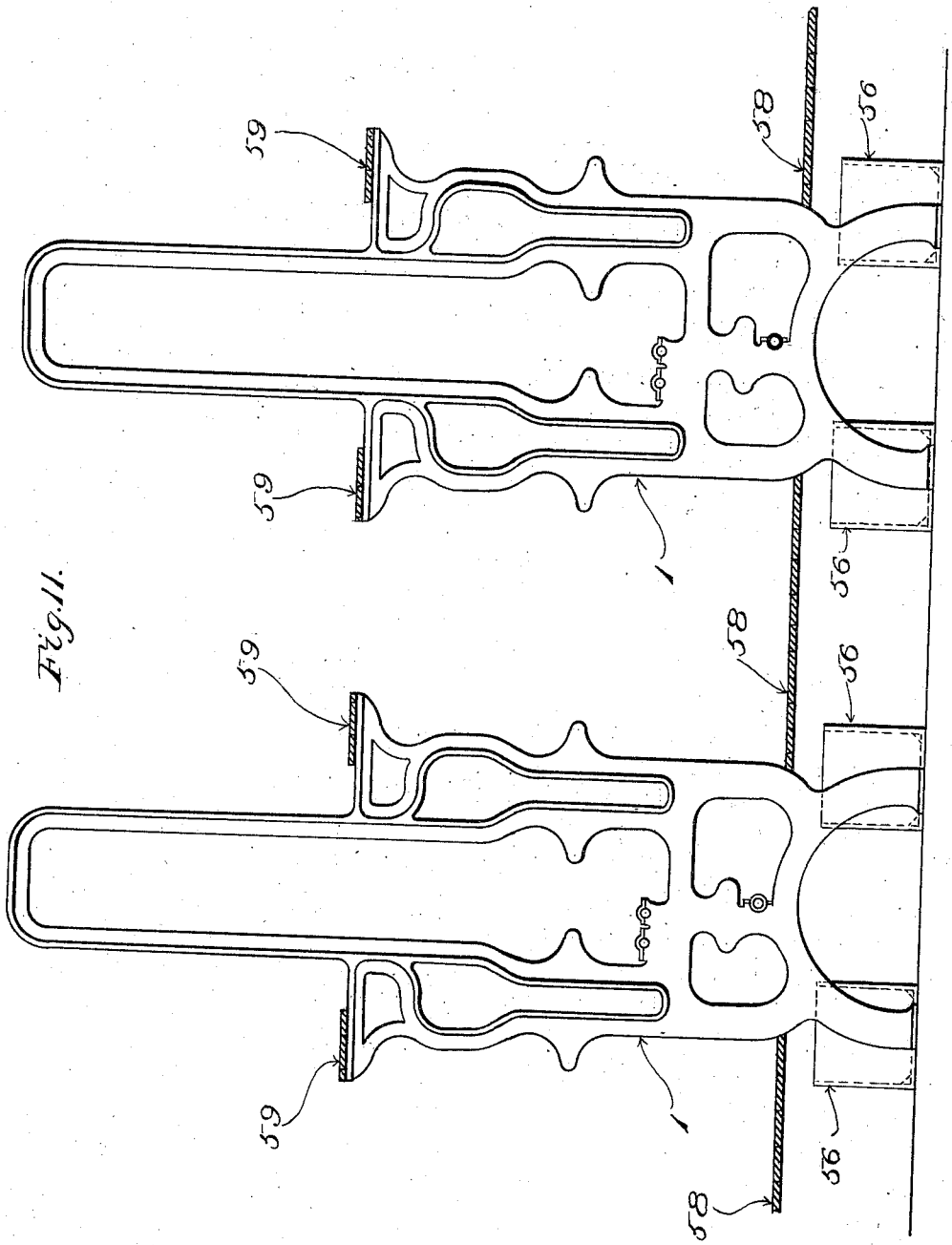

UNITED STATES PATENT OFFICE.

GEORGE C. MOORE, OF REVERE, MASSACHUSETTS.

LOOM.

No. 850,595.      Specification of Letters Patent.      Patented April 16, 1907.

Application filed September 15, 1906. Serial No. 334,797.

*To all whom it may concern:*

Be it known that I, GEORGE C. MOORE, a citizen of the United States, residing at Revere, in the county of Suffolk, State of Massachusetts, have invented a certain new and useful Improvement in Looms, of which the following is a specification, reference being had therein to the accompanying drawings.

The invention resides in a loom of the vertical type embodying various novel and useful features of construction, &c., by means of which an increase of productive capacity is secured, goods of a better quality are enabled to be produced, and a reduction is effected in the amount of power consumed as compared with looms now in use.

The invention is illustrated in the drawings, in which latter—

Figure 2:
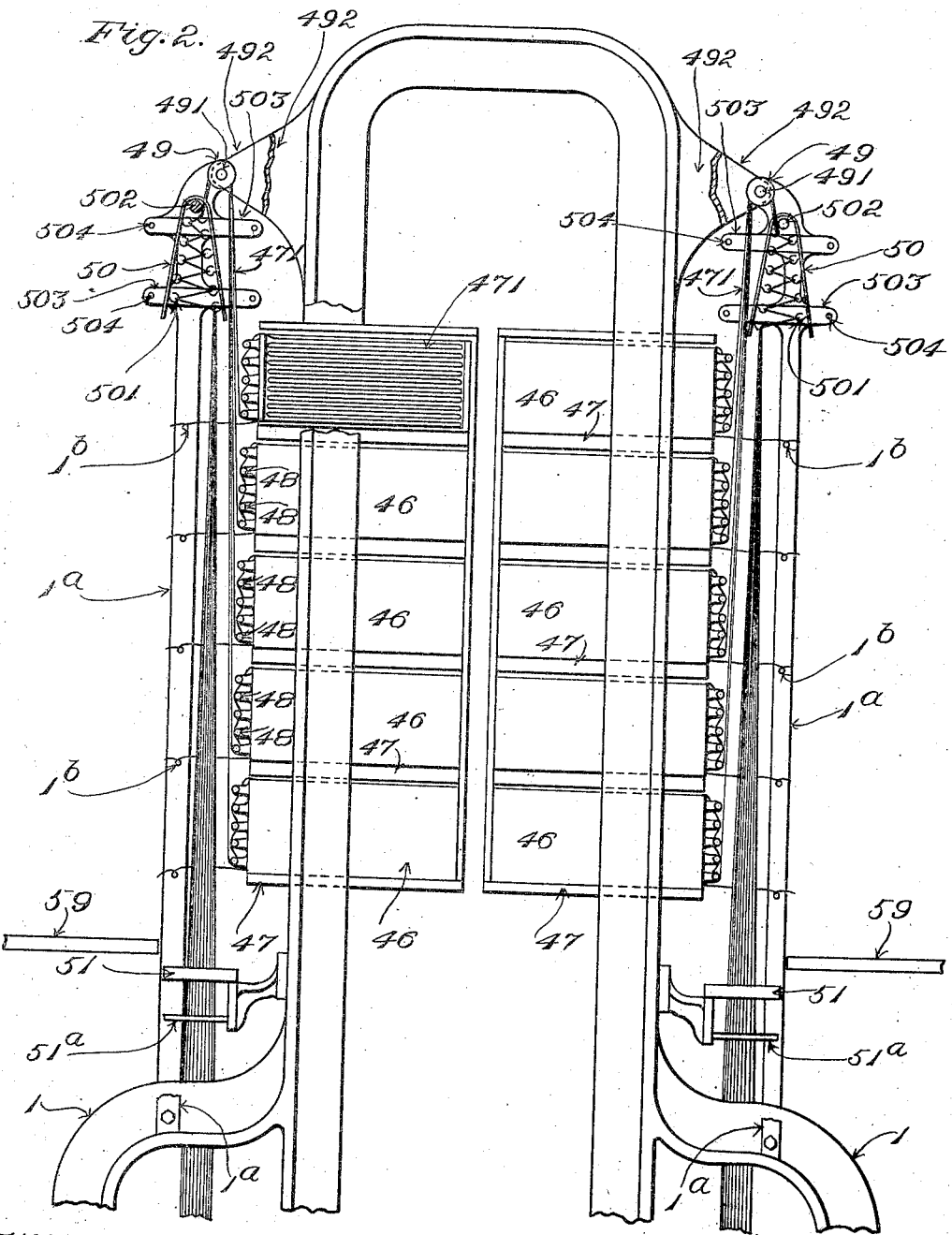
Figure 3:
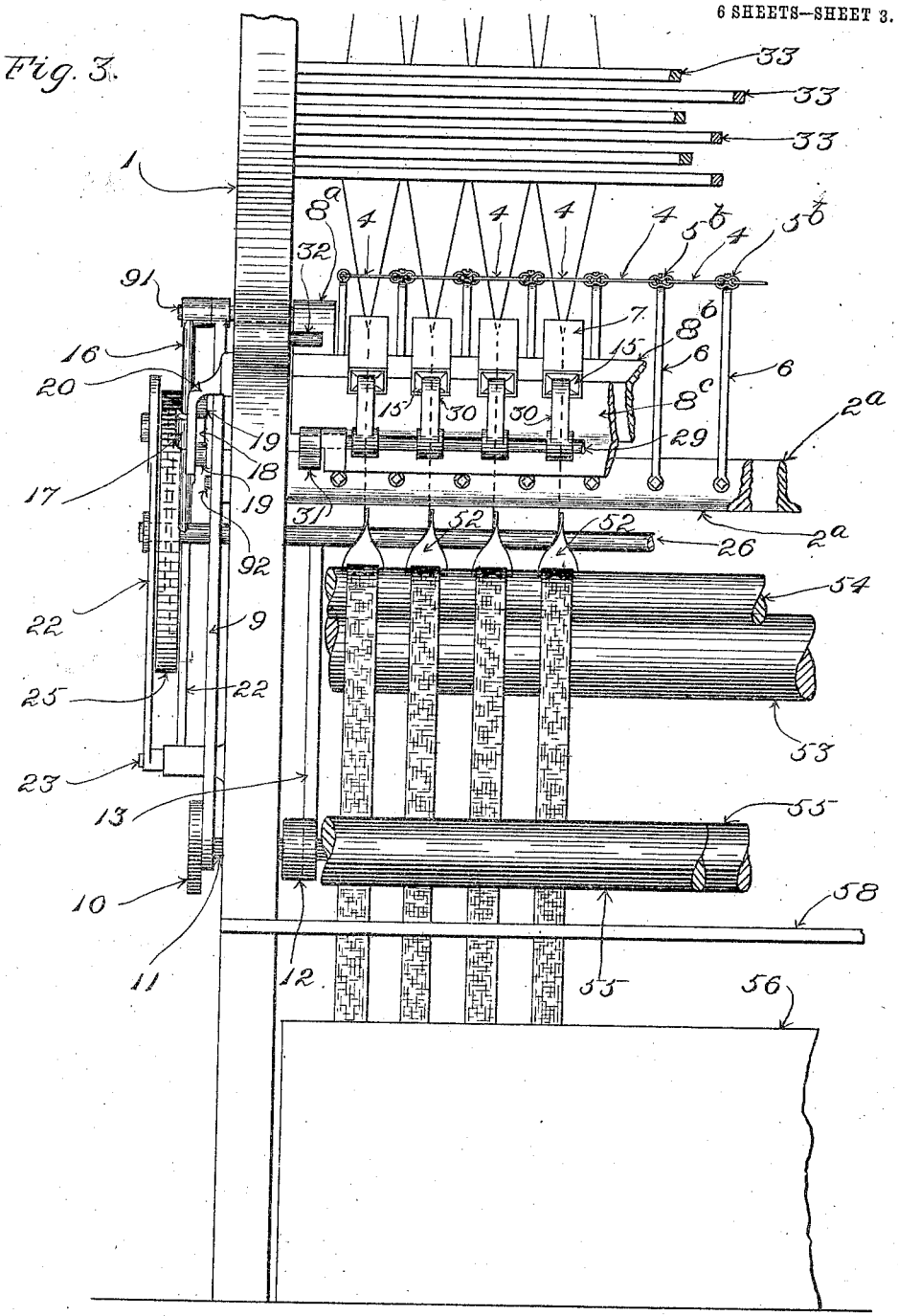

Figure 1 shows in end elevation, partly broken away, the lower portion of a multiple-web double loom containing embodiments of the features of the invention. Fig. 2 shows in end elevation the upper portion or castle of the said loom. Fig. 3 is a side elevation of a portion of the length of the lower part of double loom of Figs. 1 and 2. Fig. 4 is a similar view of a portion of the length of the upper part of such loom. Fig. 5 is an end elevation of a portion of the said double loom, illustrating the shedding mechanism. Fig. 6 is a view in side elevation of the shedding mechanism of Fig. 5. Fig. 7 is an elevation, on an enlarged scale, of a series of reeds and the means of supporting the same on the lay. Fig. 8 is a side elevation thereof with the lay-beams in vertical cross-section. Fig. 9 shows a heddle-strip in edge view. Fig. 10 shows the same in side elevation. Fig. 11 is a diagram of two double looms and the platforms in connection therewith.

Having reference to the drawings, the drawings show a double vertical loom. Each section or half thereof is complete as regards the weaving mechanism, comprising lay, harnesses and operating connections therefor, shuttle-operating mechanism, &c., although but one driving-shaft and one crank-shaft are employed, with suitable actuating connections from such shafts to the various operative parts.

1 1 are the opposite end frames of the said double loom.

2 2 in Fig. 1 are cross-heads, forming the ends of the lays and moving in guideways 3 3 in the end frames. The said guideways extend vertically, and in action the lays rise and fall.

$2^a$ $2^a$, Figs. 3, 7, and 8, are a pair of parallel lay-beams extending longitudinally of the loom in each section thereof and having cross-heads connected with their opposite ends. To secure stiffness and strength, the lay-beams $2^a$ $2^a$ are formed of L shape in cross-section and are arranged with one flange of each thereof horizontal and the other vertical and extending upwardly therefrom, straight sides of the vertical flanges being presented toward each other and separated by a space suitable to accommodate the width of the webs which are produced in the loom. The reeds 4 4 are supported upon the lay-beams $2^a$ $2^a$ by means of uprights 6 6, Figs. 1, 3, 7, and 8, provided with clamps which receive and hold the side bars of the reeds. As shown separately in Figs. 7 and 8, the uprights 6 6 are respectively U-shaped. They are secured to the lay-beams $2^a$ $2^a$, with the bent or closed ends thereof uppermost, the lower ends of the legs of the uprights being attached to the respective lay-beams. The clamps are mounted upon the said bent or closed upper ends of the uprights, the latter extending crosswise with respect to the opening or space between the lay-beams. Each clamp is composed of a lower or fixed member $5^a$ and an upper or movable member $5^b$, these members being hollowed out to fit the side bars of the reeds and being held together by screws $5^c$. Each half of the intermediate clamps of the series of clamps receive and hold the side bars of two adjoining reeds. The dents of the reeds 4 4 extend longitudinally of the loom, and as many reeds are employed in each section of the double loom as there are webs to be woven in such section.

At 7 7, Figs. 1 and 3, are shuttle boxes or guides, and at 8 8 are carriers therefor. There is one of the said shuttle-box carriers for each loom constituting one section or half of the double loom, the said carrier having applied thereto the shuttle guides or boxes pertaining to the said section or half. Each shuttle-box carrier 8 comprises cross-bars $8^a$, Fig. 1, of L shape in cross-section, and longitudinal L-shaped bars $8^b$ $8^b$ and $8^c$ $8^c$. Vertical flanges of the bars $8^b$ and $8^c$ at each side of the shuttle-box carrier are placed together, the horizontal flange of bar $8^b$ fitting upon the ends of cross-bars $8^a$ and the horizontal flange of bar $8^c$ projecting outwardly. In each section or half of the double loom the cross-heads 2 2 and the shuttle-box carrier 8 are connected with arms 9 9, by which they are supported vertically and through which movement up and down is communicated to them.

For the purpose of causing the vertically-movable parts of one section or half to counterbalance those of the other the respective arms 9 9 of the two sections or halves of the double loom are connected pivotally at their lower ends to opposite rocker-arms 10 10, which are fast upon a rock-shaft 11, that is mounted in bearings with which the loom-frame is provided. For the purpose of imparting the required movements to the shuttle-box carriers and lays each arm 9 is connected to the corresponding shuttle-box carrier 8 by means of a pivotal connection, comprising in Figs. 1 and 3 a pivot 91, projecting from the end bar 8ª of the carrier and fitting within an eye formed in the upper end of arm 9, and the said arm is connected to the cross-head 2 of the corresponding lay by means of a pin 92. The required reciprocating movements of the lays and carriers in the respective sections of the double loom are produced by communicating rocking movement to the rocker-arms, which is effected by means of an arm 12, fast on the rock-shaft 11, a connecting-rod 13 having one extremity thereof connected to the said arm 12 and its other extremity connected to a crank of the crank-shaft 14, which last is mounted in bearings with which the loom-frame is provided. Fig. 1 shows the lays, &c., at half-stroke, the vertically-movable parts of the left-hand section being half-way up and those of the right-hand section being half-way down.

At 15 15 are shuttles, those of the left-hand section of the double loom occupying in Fig. 1 the left-hand shuttle guides or boxes 7 of the carrier 8 of the said section just prior to their passage through the sheds in the warps and those of the right-hand section being shown as having arrived in the shuttle boxes or guides 7 at the right-hand side of the corresponding carrier 8 after their passage through the sheds. I utilize the force of gravity in effecting the movements of the shuttles through the sheds, either alone or in conjunction with shuttle-propelling devices. To this end I communicate to each shuttle-box carrier 8 a rocking or tilting movement upon its pivots at 91, by means of which the shuttle guides or boxes, which at a given time in the working of the loom contain the shuttles, are swung upwardly into an inclined position and the opposite shuttle guides or boxes of the said carrier are swung down, thus occasioning a tendency of the shuttles to slide in an inclined direction downward from the former set of shuttle guides or boxes through the sheds in the warps into the latter set of shuttle guides or boxes. At the left-hand side in Fig. 1 the carrier and its shuttle guides or boxes are in the horizontal position which they assume at an intermediate point in the upward stroke of the lay and carrier at such side of the double loom immediately prior to the beginning of the tilting movement, which raises the left-hand shuttle guides or boxes of the said carrier and depresses the right-hand shuttle guides or boxes thereof, while at the right-hand side in the said figure the carrier at the latter side of the double loom occupies the inclined position which was given to it to provide for the passage of the shuttles from the left-hand shuttle guides or boxes of the said carrier to the right-hand shuttle guides or boxes thereof.

The carriers have combined therewith mechanism for automatically rocking or tilting the same at the proper times in the working of the loom. Thus each carrier is shown provided with an arm 16, projecting downward therefrom and passing through a swivel-piece 17, which is pivoted to a bar 18, extending transversely of the loom and movable in the direction of its length. A separate bar 18 is provided in connection with each carrier on account of the differences in the timing of the tilting movements of the respective carriers. Each bar 18 is supported and guided by rolls 19 19, (shown only at the right-hand side of Fig. 1,) which are carried by brackets or stands 20 20, that are bolted to the loom-frame. In order to show the inner parts more clearly, a portion of the end frame 1, the brackets 20 20, and the rollers 19 19 are broken away at the left-hand side of Fig. 1. Each bar 18 is connected, by means of a link 21, to an arm or lever 22, which is pivoted at 23 to the loom-frame and provided with a pin or roll 24, working in the groove of a cam 25, the latter being fast on a shaft 26, which is driven by gearing 27 28 from the crank-shaft 14.

To provide for varying or regulating the extent of the tilting movements, each arm 22 is slotted longitudinally, and the pin or bolt 211, which connects the corresponding link 21 therewith, is adjustable in well-known manner longitudinally of the slot. The shuttle-propelling devices for each section of the double loom comprise rock-shafts 29 29, which respectively are mounted upon the horizontal flanges of the longitudinal side beams 8ᶜ 8ᶜ of the carrier 8 at the respective sides of the said carrier, each of the said rock-shafts being furnished with picking-arms 30 for action against the ends of the respective shuttles. For the actuation of the picking rock-shafts each thereof is furnished with an arm 31, which during the rise of the lay and carrier and by the upward swing of the corresponding side of the carrier is carried against a fixed stop, as 32, which is provided upon the loom-frame, the said stop acting against the said arm to turn the rock-shaft so as to cause the picking-arms 30 to impel the shuttles endwise. At the left-hand side of Fig. 1, in consequence of the fact that a portion of the loom-framework is broken away, the positions of the fixed stops 32 32 are indicated by dotted lines. In the descent of a lay and carrier the picking rock-shaft 29, which has been partially turned in the manner stated, is rocked reversely through the influence of a spring or springs. (Not shown.) The shuttles in their movement travel beneath the uplifted reeds, and the latter in the descent of the respective lays beat the freshly-laid weft-threads downward. The reeds being unconnected with the carriers do not partake of the tilting or rocking movements of the latter.

The harness-frames are designated 33 33, &c. They occupy horizontal positions, one above another, and extend lengthwise of the loom. They are arranged to move endwise in the direction of the length of the loom and are provided with heddles having the eyes thereof arranged to correspond with the number of webs which the loom is designed to weave in the direction of its length. To enable the webs to be woven close to one another, thereby increasing the number of pieces which can be woven at one time, I preferably employ heddles consisting of strips of considerable length and having a series of heddle-eyes, one for a warp-thread of each of a number of webs. Such a strip is shown at 331, Figs. 9 and 10, in which the heddle-eyes are marked 332 332, &c. The spacing of the eyes of each heddle-strip apart from one another in the direction of the length of such strip corresponds with that of the webs which are being woven. Supports 34 34, &c., Fig. 1, for the harness-frames are provided at intervals in the length thereof suitable to guide them and obviate sagging. These supports are furnished with antifriction-rolls 35 35, &c., upon which the side bars of the harness-frames rest and which facilitates the movements of the harness-frames. In Fig. 1, in addition, each harness-frame except the uppermost is guided along its sides by the rolls for the harness-frame next above, the side guides for the uppermost harness-frame being constituted by upwardly-extending projections, forming portions of the supports 34 34.

It will be observed that the harness-frames are of graduated width, each thereof being somewhat wider than the one next below the same and projecting at opposite sides beyond the latter to rest upon the corresponding series of rolls. This results in a stepped series of harness-frames, narrowest at the bottom of the series. This stepping of the harness-frames, as will be obvious from Fig. 1, provides for the tipping of the lay without necessitating too great a distance between the lay and the harness-frames at the time of closest approach. It also lets more light in, so as to facilitate operations in repairing warps and inserting fresh portions of threads.

For the actuation of the harness-frames the ends thereof at one end of the loom are joined by connections 36 36, &c., Figs. 5 and 6, to the upper arms of harness-levers 37 37, &c., which are mounted pivotally upon a supporting-rod 38, carried by the loom-frame, and actuated by harness-cams 39 39, &c., upon a shedding cam-shaft 40, which extends transversely across such end of the loom and is driven from the crank-shaft 14 by connections comprising the bevel-pinion 41 on the crank-shaft, the bevel-gear 42, engaged by the said bevel-pinion and fast on the upper end of the short upright shaft 43, the bevel-pinion 44, fast on the lower end of the said shaft, and the bevel-gear 45, fast on the shedding cam-shaft. The connection between each harness-lever and the corresponding harness-frame is rigid, so that movement is transmitted positively from the former to the latter in both directions. Each connection contains as a part thereof a right-and-left screw 36$^a$, by means of which the total effective length of the connection may be varied as found necessary.

The warp-threads may be supplied from warp-beams in usual manner, if desired; but preferably I employ warps in long chains contained in suitable holders or containers in which they have been plaited or otherwise deposited. Fig. 2 shows two vertical series of rectangular containers 46 46, &c., supported in the castle of the loom upon shelves 47 47, &c., and each holding a chain 471 of warp-threads lying therein in longitudinal horizontal folds or plaits. One side of one of the said containers is removed or broken away in the said figure to show the chain within such container. The chain may be deposited otherwise in the container. It preferably is delivered from the open top of each container and is or may be passed in a sinuous course partly around each of the successive bars or rods 48 48, &c., Figs. 2 and 4, of the series of such bars which is provided on the outer end of the container. Thereby doubled or looped portions of the chain are prevented from drawing forward and a certain amount of tension is communicated to the warp. The respective chains or warps pass upward side by side to and around rolls or pulleys at 49 49, Figs. 2 and 4, upon a rod 491, supported by brackets 492 492 upon the upper part of the loom-frame, and thence downward. Each chain or warp after leaving the roll or pulley 49 passes through a tension device 50 and then after passing through the back reed 51 and between a pair of rods 51$^a$, Figs. 2 and 4, goes through the eyes of the harness and the dents of the appropriate reed 4. Each tension device 50 comprises opposite arms, which are provided on the inner side of each of its branches with a series of hook-shaped guides 501, those on one branch alternating with those on the other, the said arms tending normally to occupy positions separated from each other. The tension device usually is formed as a spring strip or bar bent into V shape or U shape and is hung upon a supporting-rod 502, which is supported by uprights 1$^a$, forming part of the loom-frame. The chain or warp is hooked onto the guides of the two branches in alternating succession, beginning next the bend of the strip or bar. To decrease or increase the tension, the number of guides with which the chain or warp is engaged will be varied. The tendency of the branches to separate from each other causes the device to take up any slackness in the portion of the chain or warp leading to the weaving mechanism, while as the weaving progresses and the woven web is advanced the increasing strain on the chain or warp causes the branches of the tension device to approach each other, thereby decreasing the frictional resistance to the passage of the chain or warp through the tension device and permitting a fresh portion of the length of the chain or warp to be drawn through the device.

As shown in Figs. 2 and 4, the containers 46 46, &c., are disposed in banks or tiers, one container above another, there being five containers in a vertical series at each side of the double loom. The guide-pulleys 49 49 and tension devices 50 50, &c., for the five chains or warps of each of the said series are arranged side by side upon their respective supports, the tension devices being separated by division-strips 503 503, &c., which are loosely strung upon supporting - wires 504 504, &c. The tension devices and division-pieces may be separated from one another by moving them upon their supporting rods and wires when it is desired to obtain access to a given tension device for the purpose of applying the chain or warp to the hooked guides thereof or removing the same therefrom.

In order to prevent the final end of a chain of warps from being drawn through the guides, tension devices, &c., before the fact is noticed, the said end is passed out through an opening in the outer end of the corresponding container, as indicated in Fig. 2, and tied to a wire 1$^b$, supported by the uprights 1$^a$ 1$^a$ and extending longitudinally of the loom.

The warps are arranged at an angle transversely with respect to the length of the loom and the webs as woven also extend at such angle. Each web in passing downward to the take-up devices is caused to make contact with a web-turning guide 52. Each of the said guides has the acting face thereof formed with a quarter-turn, by means of which the web while pressing closely against the said face is turned quarter-way around, so that on leaving the guide its width extends in the direction of the length of the loom. The guides are arranged above the take-up roll 53 and the webs after leaving the guides pass to and part way around the periphery of the said take-up roll, then between such roll and the coöperating presser - roll 54, then over and partly around the latter roll, and then down to and between the rolls 55, which latter deliver the same into the box 56 or other receptacle, resting on the floor. Rolls 53 and 55 are driven by suitable mechanism not necessary to be shown. When weaving elastic webs, the rolls 55 will be driven at a rate properly proportioned to that of the take-up roll 53 to permit the web to contract properly between the take-up roll 53 and its presser-roll 54 and the pair of rolls 55.

In order to permit the weaver to attend to the weaving operations and look after the web while being produced without being interrupted by the movements of the attendant who looks after the removal of the woven goods and the replenishment of the warp-supply, I provide a platform 58 between each two double looms, (see Fig. 11,) the platform being shown also in Figs. 1 and 3, upon which the weaver may stand and move about. The said platform 58 is at a height from the floor greater than that of the boxes 56 56, enabling large boxes of great capacity to be employed and permitting them to be moved about beneath the platform and to be inserted into place in the looms or withdrawn from under the latter by an attendant creeping under the platform. The said attendant will find at the ends of the platform—that is to say, adjacent the ends of the loom—ample room for entrance to the space beneath the platform for himself and the boxes and opportunity for exit and for the withdrawal of the filled boxes from the said space. The shelves 59 59 at opposite sides of the castle or upper framework of the loom above the head of the weaver are for support of the attendant in looking after the warp - supply.

The loom which has been described affords an increase in production by permitting the number of webs which can be woven within a given space to be increased, also by enabling the shuttle to be made of a capacity to carry an amount of weft-yarn greatly in excess of what is possible in the ordinary shuttle of a narrow-ware loom, also by requiring much less space for the accommodation of the containers or holders for the warps and the tension-regulating devices than where warp-beams and the usual forms of tension-regulating devices are employed, and also by decreasing the possibilities of wear and tear and of breakage, thereby avoiding stoppages and permitting an increase of the speed of the loom. The said loom enables the production of goods of a better quality by reason of the employment of a large shuttle containing weft-yarn in a cop form, thereby enabling a more regular and uniform tension to be maintained in the weft-yarn by tension-regulating devices acting directly on the yarn itself than is possible when the weft-yarn is wound upon quills, as customary when the usual shuttles of narrow-ware looms are employed, also in consequence of the fact that the warp-yarns are drawn almost in a direct line from near the supply thereof, it being understood by weavers that in cases where the tension of the warps is irregular, the longer the uninterrupted stretch of the warps intermediate the source of supply and the point where the weaving occurs the greater is the opportunity for equalization. The swinging movement of the shuttle-box carrier causing the shuttles to move in an arc inward toward the proximate selvages of the webs prior to beginning their movements through the shed gives better selvages. The greater length of weft which is contained in a shuttle decreases the number of times the cloth has to be let back to compensate for loss of picks of weft resulting on account of weft exhaustion. The loom enables a reduction to be effected in the amount of power consumed as compared with looms now in use by reason of the fact that the lays, &c., in the respective sections of the double loom balance with each other, thereby reducing the power which is required for beating up, also inasmuch as the harnesses work horizontally on rollers there are no weights to lift, no springs to stretch, and no straps to pull at a right angle around rolls, as in other looms, and the fact that the movement of the shuttles is due largely to the force of gravity reduces the amount of power required for picking.

I claim as my invention—

1. In a double vertical loom, in combination, opposite vertically-moving lays operatively connected to act with mutual counterbalancing effect, and operating means therefor.

2. In a double vertical loom, in combination, opposite vertically-moving lays, and operating connections whereby the said lays are caused to move simultaneously in opposite directions with respect to each other and with counterbalancing effect.

3. In a double vertical loom, in combination, opposite vertically-moving lays, an intermediate rocker connected with the said lays whereby the latter are caused to move simultaneously in opposite directions with respect to each other, and means for occasioning reciprocating movements of the lays.

4. In a double vertical loom, in combination, opposite vertically-moving lays, a rockshaft having opposite arms with which, respectively, the respective lays are operatively connected, and a crank-shaft operatively connected with the said rock-shaft.

5. In a vertical loom, a lay, combined with means to tilt the shuttle-guiding portion thereof alternately in opposite directions with respect to the length of the warps to cause gravity to act in moving the shuttle through the respective sheds.

6. In a loom, harnesses, and means for supporting and operating the same, combined with a lay, and means for tilting the shuttle-guiding portion thereof alternately in opposite directions transversely with respect to the harness-frames and warps, to cause gravity to act in moving the shuttle through the respective sheds.

7. In a vertical loom, a lay, and means to tilt the shuttle-guiding portion thereof alternately in opposite directions with respect to the length of the warps to cause gravity to act in moving the shuttle through the respective sheds, combined with shuttle-picking devices.

8. In a loom, harnesses, and means for supporting and operating the same, combined with a lay, means for tilting the shuttle-guiding portion thereof alternately in opposite directions transversely with respect to the harness-frames and warps to cause gravity to act in moving the shuttle through the respective sheds, and shuttle-picking devices.

9. In a loom, a reciprocating lay, and a reed thereon supported at a fixed angle transversely of the loom, combined with means to tilt the shuttle-guiding portion of the lay alternately in opposite directions to cause gravity to act in moving the shuttle through the respective sheds.

10. In a loom, a reciprocating lay, and a reed thereon supported at a fixed angle transversely of the loom, combined with means to tilt the shuttle-guiding portion of the lay alternately in opposite directions transversely, and shuttle-picking devices.

11. In a vertical loom, in combination, a lay, a reed thereon, shuttle-guides located at opposite sides of the warps, and means to tilt the said guide alternately in opposite directions with respect to the length of the warps to cause gravity to act in moving the shuttle through the shed.

12. In a vertical loom, in combination, a lay, a reed thereon, shuttle-guides located at opposite sides of the warps, means to tilt the said guides alternately in opposite directions with respect to the length of the warps to cause gravity to act in moving the shuttle through the shed, and shuttle-picking devices.

13. In a double vertical loom, in combination, opposite lays, means to move the same simultaneously in opposite directions, and means to tilt the respective shuttle-guides of the respective lays for the movements of the respective shuttles through the sheds.

14. In a loom, in combination, the heddles thereof, means to move the same longitudinally of the loom, a lay provided with a reed having the dents thereof extending longitudinally of the loom, a web-turner, and a take-up roll having its axis extending longitudinally of the loom.

15. In a multiple-web loom, in combination, the heddles thereof, means to move the same longitudinally of the loom, a lay provided with reeds having the dents thereof extending longitudinally of the loom, a series of shuttles, means to occasion movement of the same transversely of the loom, web-turning devices, and a take-up roll having the axis thereof extending longitudinally of the loom.

16. In a vertical loom, in combination, a lay, shuttle-guides movable therewith, means to tilt the said shuttle-guides alternately in opposite directions for the movements of the shuttles through the sheds, picking rock-shafts provided with devices for propelling the shuttles, and actuating means for said rock-shafts.

17. In a vertical loom, in combination, a lay, a reed carried thereby, a tilting carrier provided with shuttle-guides, picking rock-shafts mounted on said carrier and having shuttle-propelling devices in connection therewith, and actuating means for the said rock-shafts.

18. In a loom, in combination, the horizontal harness-frames, and the stepped series of rolls serving to support said harness-frames and also to restrain the same from transverse movement.

19. In a loom, in combination, the harness-frames of graduated width, means to move the same for shedding, and stepped supports on which the side edges of said harness-frames rest, the said supports also constituting guides for the side edges of the harness-frames.

20. In a loom, in combination, the harness-frames of graduated width, means to move the same for shedding, and rolls on which the side edges of the said harness-frames rest.

21. In a loom, in combination, the harness-frames of graduated width, means to move the same for shedding, and rolls supporting the side edges of the said harness-frames and also constituting side guides for the latter.

22. In a loom in which a plurality of webs is woven in parallel vertical planes extending transversely of the loom, in combination, a lay carrying suitable reed-dents extending longitudinally of the loom, a plurality of shuttles, means for operating the said shuttles transversely of the loom, and shed-forming mechanism comprising heddles extending longitudinally of the loom and having a plurality of warp-eyes, one for each web of a series of webs.

23. In a loom, in combination, the weaving instrumentalities, a container or holder within which a chain of warps is deposited loosely, and tension devices acting upon the said chain on its way to the said weaving instrumentalities.

24. In a loom, in combination, the weaving instrumentalities, a container or holder for a chain of warps, and a tension device having oppositely-located guides through which the chain is conducted in alternating succession, and provided with means tending to move the opposite guides away from each other.

25. In combination, a container or holder for a chain of warps, and a series of guide-bars around which in alternating succession the chain is conducted on leaving the said container or holder.

26. In combination, a container or holder for a chain of warps, a series of guide-bars around which in alternating succession the chain is conducted on leaving the said container or holder, and a yielding tension device acting upon the said chain on its way from the said guide-bars.

27. In a loom, in combination with the weaving instrumentalities for the production of a woven web, a tier of warp-containers each adapted to have a chain of warps loosely deposited therein, and yielding tension-regulating devices acting directly upon the respective chains.

28. In a loom, in combination with the weaving instrumentalities for the production of a woven web, a plurality of warp-containers, each adapted to have a chain of warps loosely deposited therein, yielding tension-regulating devices acting directly upon the respective chains, and a support on which the said tension-regulating devices are mounted with capacity for lateral movement to separate one from another thereof.

29. In a loom, in combination with the weaving instrumentalities for the production of a woven web, a plurality of warp-holders, a series of yielding tension devices, substantially as described, a support on which the said tension devices are hung, and loosely-mounted division-pieces separating the tension devices from one another.

30. A bank of warp-containers comprising two or more tiers, side by side, each warp-container having a chain of warps loosely deposited therein, and tension-regulating devices acting upon the respective chains.

31. A bank of warp-containers comprising two or more tiers side by side, each warp-container having a chain of warps loosely deposited therein, guides for the respective chains, and yielding tension-regulating devices, one for each chain.

32. In combination, a series of supports, one above another, warp-containers removably resting upon the said supports and each adapted to have a chain of warps loosely deposited therein, guides for the respective chains, and individual tension devices for the respective chains.

33. In a loom, in combination, the heddles thereof, means to move the same longitudinally of the loom, a lay provided with a reed having the dents thereof extending longitudinally of the loom, a shuttle and means to move the same at an angle to the length of the loom, and a take-up roll having its axis extending longitudinally of the loom.

34. In a multiple-web loom, in combination, the heddles thereof, means to move the same longitudinally of the loom, a lay provided with reeds having the dents thereof extending longitudinally of the loom, a series of shuttles, means to occasion movement of the same at an angle to the length of the loom, and a take-up roll having the axis thereof extending longitudinally of the loom.

In testimony whereof I affix my signature in presence of two witnesses.

GEORGE C. MOORE.

Witnesses:
CHAS. F. RANDALL,
EDITH J. ANDERSON.